US012548888B2

(12) United States Patent
Zierhut et al.

(10) Patent No.: US 12,548,888 B2
(45) Date of Patent: Feb. 10, 2026

(54) PLUGGABLE CONNECTIONS OF DIPOLE

(71) Applicant: HUAWEI TECHNOLOGIES CO., LTD., Guangdong (CN)

(72) Inventors: Dieter Zierhut, Munich (DE); Bernhard Rist, Munich (DE); Christian Helbig, Munich (DE); Johann Baptist Obermaier, Munich (DE); Serban Rebegea, Shenzhen (CN); Tekin Ölmez, Munich (DE); Liansong Wang, Dongguan (CN); Qiangguo Zhou, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 18/532,429

(22) Filed: Dec. 7, 2023

(65) Prior Publication Data

US 2024/0106107 A1 Mar. 28, 2024

Related U.S. Application Data

(63) Continuation of application No. PCT/EP2021/065093, filed on Jun. 7, 2021.

(51) Int. Cl.

*H01Q 9/06* (2006.01)
*H01P 1/18* (2006.01)
*H01Q 1/24* (2006.01)

(52) U.S. Cl.

CPC ............... *H01Q 1/246* (2013.01); *H01P 1/18* (2013.01); *H01Q 9/065* (2013.01)

(58) Field of Classification Search

CPC ........... H01Q 1/24; H01Q 1/246; H01Q 9/065
See application file for complete search history.

(56) References Cited

U.S. PATENT DOCUMENTS 8,599,072 B2 12/2013 Reed et al.
2009/0303135 A1 * 12/2009 Reed ...................... H01Q 1/246 343/702

OTHER PUBLICATIONS

International Search Report and Written Opinion in International Appln. No. PCT/EP2021/065093, mailed on Mar. 7, 2022, 12 pages.

* cited by examiner

*Primary Examiner* — Hoang V Nguyen
(74) *Attorney, Agent, or Firm* — Fish & Richardson P.C.

(57) ABSTRACT

A dipole including a flexible end configured for being plugged into a socket in an antenna structure. The flexible end includes two plastic parts hingedly connected to each other. The dipole provides a pluggable and adjustable connection with the antenna structure.

20 Claims, 4 Drawing Sheets

PLUGGABLE CONNECTIONS OF DIPOLE

CROSS-REFERENCE TO RELATED APPLICATIONS

This application is a continuation of International Application No. PCT/EP2021/065093, filed on Jun. 7, 2021, the disclosure of which is hereby incorporated by reference in its entirety.

TECHNICAL FIELD

The present disclosure relates generally to the field of antenna devices, and more specifically, to a dipole with a flexible end.

BACKGROUND

In mobile communication networks, antennas used for base stations are typical array antennas which consist of conventional dipoles (or radiators) in a cross configuration in order to generate a +45° and −45° polarization. Currently, various dipoles are available, such as, a conventional die casted dipole in combination with an additional plastic part, another conventional etched planar dipole with many planar substrates and additional plastic parts or less used injection moulded plastic parts with metallic lines on the planar substrates. Various technologies are commonly used for production of such dipoles. The available technologies of such dipoles production are characterized by several time-consuming production steps. The steps include, for example, alignment of various parts of such dipoles, soldering the dipole parts together for providing electrical contact and assembly of additional plastic parts due to mechanical (stability) or electrical (matching and pattern correction) reasons. The conventional dipoles (i.e., the die casted dipole or the etched planar dipole) include several parts, resulting into a complex structure of a conventional antenna. Additionally, the assembly cost of the several parts of the conventional dipoles become relevant in overall production cost of the conventional antenna. The reliability of the conventional antenna gets affected due to the complex structure and the difficult production process. The material of the additional plastic parts of the conventional dipoles (i.e., the die casted dipole or the etched planar dipole) is required to be solderable and to withstand at high temperature while soldering. Due to this reason, the material of the additional plastic parts of the conventional dipoles is highly expensive. The conventional dipoles (i.e., the die casted dipole or the etched planar dipole) manifest a somewhat low cost, however, the electrical connection of several parts using soldering, raise extra costs which are added to the cost of the conventional dipoles. Moreover, the connection of the conventional dipoles with another antenna element (e.g., a phase shifter) or a distribution network are extra costs. The reason being such type of connections depends on reflectors and shapes of the distribution network and performed via soldering. The access to the connection is difficult because the distribution network is required to be closed with holes to a reflector to connect to the other antenna element (i.e., the phase shifter) or the distribution network to the conventional dipoles. In order to connect (or plug) the conventional dipoles capacitively, with more than one connections at one time with perfect contact or position in all directions (without or with less tolerances) may not be achieved with stiff parts. One connection is adjustable, but in more connections at once tolerances avoid gapless contacts which are required in capacitive coupling connections. Thus, there exists a technical problem of flexibility between the connections of the conventional dipoles with the other antenna element (i.e., the phase shifter) or the distribution network and not having more than one connection at one time with perfect contact or position in all directions at low tolerances.

Therefore, in light of the foregoing discussion, there exists a need to overcome the aforementioned drawbacks associated with the conventional dipoles.

SUMMARY

The present disclosure provides an improved dipole (or radiator) with a flexible end. The present disclosure provides a solution to the existing problem of flexibility between the connections of the conventional dipoles with another antenna element or a distribution network and not having more than one connection at one time with perfect contact or position in all directions at low tolerances. An aim of the present disclosure is to provide a solution that overcomes at least partially the problems encountered in prior art and provide an improved dipole (or radiator) with a flexible end which manifests a flexibility during one or more connections with another antenna element or a distribution network at low tolerances and at a low cost as well.

The object of the present disclosure is achieved by the solutions provided in the enclosed independent claims. Advantageous implementations of the present disclosure are further defined in the dependent claims.

In one aspect, the present disclosure provides a dipole comprising a flexible end configured for being plugged into a socket in an antenna structure.

The disclosed dipole provides a pluggable and adjustable connection with the antenna structure. The flexible end enables the dipole to capacitively couple with more than one connection at a time with perfect contact or position in all directions at either low tolerances or without tolerances. Moreover, the capacitive coupling of the dipole at one or more connections with the antenna structure may be obtained at such locations where access is limited or not possible. The capacitive coupling of the dipole requires no additional process (e.g., soldering process) to connect, hence, the dipole manifests a low cost.

In an implementation form, the flexible end comprises two plastic parts hingedly connected to each other.

The two plastic parts enables the dipole to have one or more flexibility connections at low cost.

In a further implementation form, the two plastic parts comprise a structural part and a pluggable part.

The structural part and the pluggable part together enable the dipole to have stability while having one or more connections with the antenna structure and freedom to adjust the one or more connections.

In a further implementation form, the flexible end comprises a hinge configured for rotating the pluggable part at an angle about the structural part and allowing for a movement of the pluggable part in a direction transverse to a length of the structural part on the application of a predetermined force.

The hinge is configured to rotate the pluggable part at a certain angle about the structural part and to move the pluggable part in the direction transverse to the length of the structural part on applying the predetermined force in order to compensate small tolerances, if any.

In a further implementation form, the hinge is configured for preserving a stable shape of the flexible end on the application of a force less than the predetermined force.

By virtue of preserving the stable shape of the flexible end on the application of the force less than the predetermined force, consequently, the hinge enables the dipole to have a stable shape.

In a further implementation form, the flexible end comprises a plastic foil and a metal structure deposited on the plastic foil.

By virtue of the plastic foil with the metal structure, the flexible end enables the dipole to have capacitive coupling with another antenna element.

In a further implementation form, the flexible end is configured for providing capacitive coupling in the socket between the metal structure and an antenna element.

The flexible end enables the dipole to be capacitively coupled with the antenna element at low cost.

In a further implementation form, the antenna element comprises a phase shifter or a signal distribution network.

In an implementation, the dipole is capacitively connected to the antenna element that may be the phase shifter or the signal distribution network, at very low tolerance.

In a further implementation form, the dipole comprises two or more flexible ends configured for being plugged into sockets in the antenna structure into a single movement.

In an implementation, the dipole may have two or more flexible ends which are further plugged into sockets in the antenna structure into the single movement without tolerances because tolerances can be aligned by flexibility.

In another aspect, the present disclosure provides a method of connecting a dipole with an antenna structure. The method comprises providing the dipole with a flexible end and plugging the flexible end of the dipole into a socket in an antenna structure.

The method achieves all the advantages and effects of the dipole of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
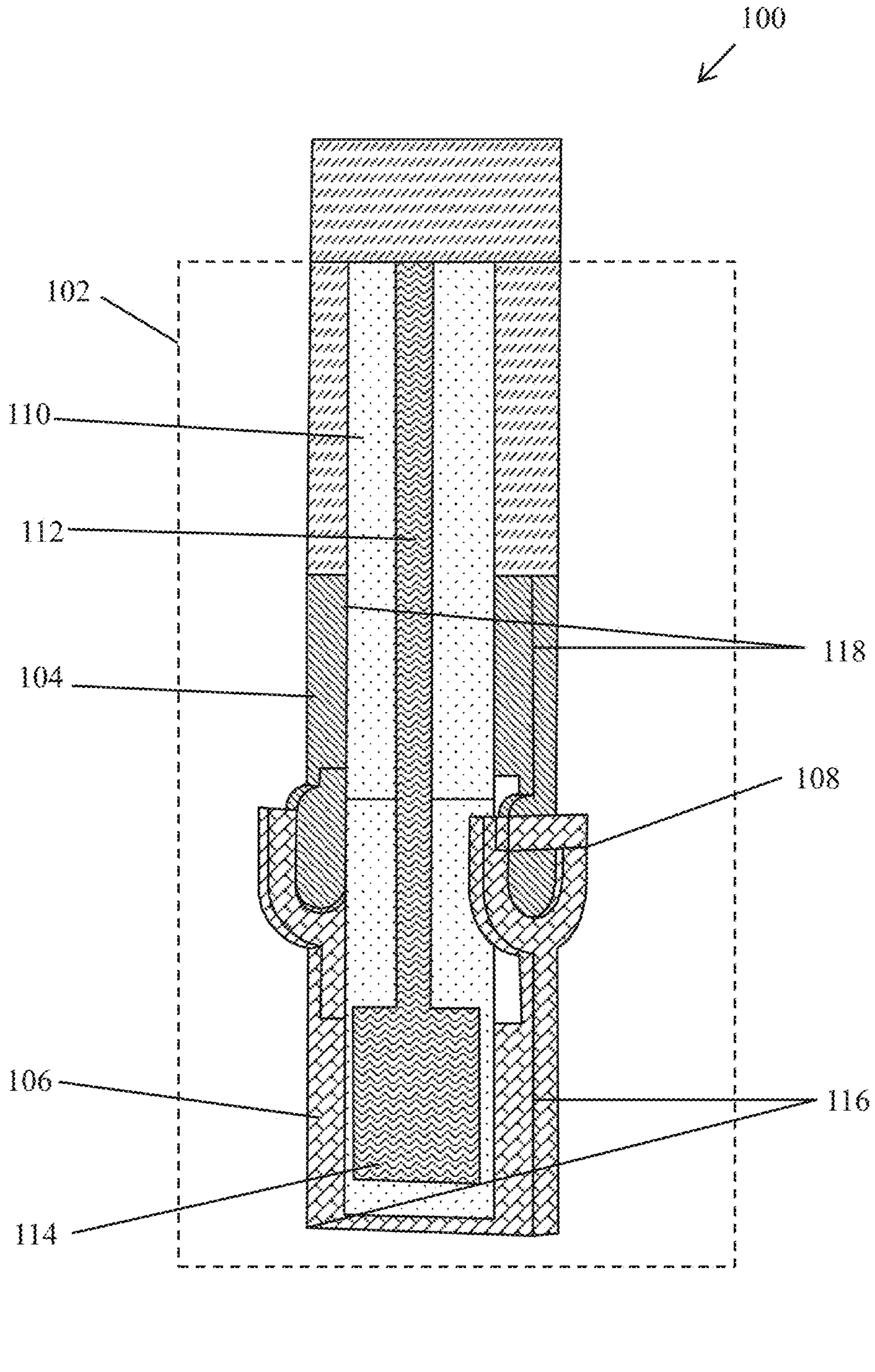
FIG. 1 is a schematic view of a dipole with a flexible end, in accordance with an embodiment of the present disclosure.

FIG. 1 is a schematic view of a dipole with a flexible end, in accordance with an embodiment of the present disclosure. With reference to FIG. 1, there is shown a dipole 100 that includes a flexible end 102. The flexible end 102 includes two plastic parts, such as a first plastic part 104 and a second plastic part 106. The flexible end 102 further includes a hinge 108, a plastic foil 110, a metal structure 112 and a connection area 114. The first plastic part 104 and the second plastic part 106 includes a structural part 116 and a pluggable part 118.

The present disclosure provides the dipole 100 that comprises the flexible end 102 configured for being plugged into a socket in an antenna structure. The dipole 100 corresponds to a solid plastic dipole with the flexible end 102. The flexible end 102 can be easily plugged into the socket of the antenna structure. The flexible end 102 may also be referred to as a pluggable end. The dipole 100 with the flexible end 102 manifests flexibility and capability to adjust to a defined connection with the antenna structure at very low tolerance.

In accordance with an embodiment, the flexible end 102 comprises two plastic parts hingedly connected to each other. The two plastic parts, such as the first plastic part 104 and the second plastic part 106 of the flexible end 102 are hingedly connected to each other by use of the hinge 108. The first plastic part 104 and the second plastic part 106 may also be referred to as a plastic support 1 and a plastic support 2, respectively. The first plastic part 104 is provided along the plastic foil 110 of the flexible end 102. The second plastic part 106 is provided close to the connection area 114 of the dipole 100. The connection area 114 corresponds to a radio frequency (RF) connection area. The flexible end 102 may have more than two plastic parts.

In accordance with an embodiment, the two plastic parts comprise the structural part 116 and the pluggable part 118. The two plastic parts, that is the first plastic part 104 and the second plastic part 106 includes the structural part 116 and the pluggable part 118 in order to have more than one connection at once. Moreover, the structural part 116 and the pluggable part 118 enables the dipole 100 to have stability while having one or more connections with the antenna structure and freedom to adjust the one or more connections.

In accordance with an embodiment, the flexible end 102 comprises the hinge 108 configured for rotating the pluggable part 118 at an angle about the structural part 116 and allowing for a movement of the pluggable part 118 in a direction transverse to a length of the structural part 116 on the application of a predetermined force. The hinge 108 is provided for rotating the pluggable part 118 at the angle about the structural part 116. The rotation of the pluggable part 118 includes a small movement in a correct position with the right angle. In an implementation, the hinge 108 may have its own tolerance, for example, a joint with a gap. Generally, small distances (or tolerances) occur in the range of approximately, 0.1 millimeter (mm) which are required to cover. For example, a pin in a blind hole with gap has stability to plug and depending on length, there is possibility of movements and rotations. Therefore, in order to compensate such small distances (or tolerances), the pluggable part 118 is required to rotate at a certain angle about the structural part 116 and allowed to move in the direction transverse to the length of the structural part 116 on applying the predetermined force.

In accordance with an embodiment, the hinge 108 is configured for preserving a stable shape of the flexible end 102 on the application of a force less than the predetermined force. On application of the force less than the predetermined force, the hinge 108 is configured to preserve the stable shape of the flexible end 102 by allowing the pluggable part 118 to rotate and to move in the desired direction and with the desired angle about the structural part 116 of the first plastic part 104 and the second plastic part 106. Consequently, the hinge 108 enables the dipole 100 to have a stable shape.

In accordance with an embodiment, the flexible end 102 comprises a plastic foil 110 and a metal structure 112 deposited on the plastic foil 110. In the dipole 100, the plastic foil 110 with the metal structure 112 is fixed on the two plastic parts that is the first plastic part 104 and the second plastic part 106 to realize the flexibility between the two plastic parts (104 and 106). The first plastic part 104 and the second plastic part 106 are designed in such a way to realize the stability to plug into the antenna structure with the freedom to adjust. The plastic foil 110 with the metal structure 112 enables the dipole 100 to have capacitive coupling with another antenna element.

In accordance with an embodiment, the flexible end 102 is configured for providing capacitive coupling in the socket between the metal structure 112 and an antenna element. By virtue of the plastic foil 110, the flexible end 102 is configured to provide the capacitive coupling between the metal structure 112 and the antenna element. Moreover, the plastic foil 110 of the flexible end 102 is made up of a low-cost plastic material, hence, there is not any requirement to withstand at high temperature of a soldering process.

In accordance with an embodiment, the antenna element comprises a phase shifter or a signal distribution network. In an implementation, the flexible end 102 of the dipole 100 may be capacitively connected to the phase shifter or the signal distribution network with very low tolerance because of the flexibility between the first plastic part 104 and the second plastic part 106. The connection of the flexible end 102 of the dipole 100 with the phase shifter or the signal distribution network is described in detail, for example, in FIG. 2.

In accordance with an embodiment, the dipole 100 comprises two or more flexible ends configured for being plugged into sockets in the antenna structure into a single movement. In an implementation, the dipole 100 may have two or more flexible ends which are further plugged into sockets in the antenna structure into the single movement without tolerances because tolerances can be aligned by flexibility. Thus, the capacitive coupling of the dipole 100 at one or more connections in the antenna structure, simultaneously, may be obtained and in the asymmetric directions as well. The two or more flexible ends enables the capacitive coupling of the dipole 100 at one or more connections in the antenna structure at such locations where access is limited or not possible and without any additional process for making the connections.

Thus, the dipole 100 provides a pluggable and adjustable connection with the antenna element, such as the phase shifter or the signal distribution network or the compact distribution network, by use of the flexible end 102. The flexible end 102 enables the dipole 100 to capacitively couple with more than one connection at a time with perfect contact or position in all directions at either low tolerances or without tolerances. The capacitive coupling of the dipole 100 requires no additional process to connect, hence, the dipole 100 requires no additional cost. Moreover, the capacitive coupling of the dipole 100 at one or more connections with the antenna element may be obtained at such locations where access is limited or not possible. The plastic foil 110 of the flexible end 102 of the dipole 100 is made up of a low cost material, which replace the soldering process used in conventional radiators for connecting various parts. Hence, the dipole 100 manifests a low-cost as well. In this way, the dipole 100 with the flexible end 102 manifests flexibility and configured to adjust the one or more connections with the antenna element at very low tolerance. The dipole 100 with the flexible end 102 that further includes the first plastic part 104, the second plastic part 106, the plastic foil 110 and the metal structure 112 may be used in an antenna used for mobile communication.

Figure 2:
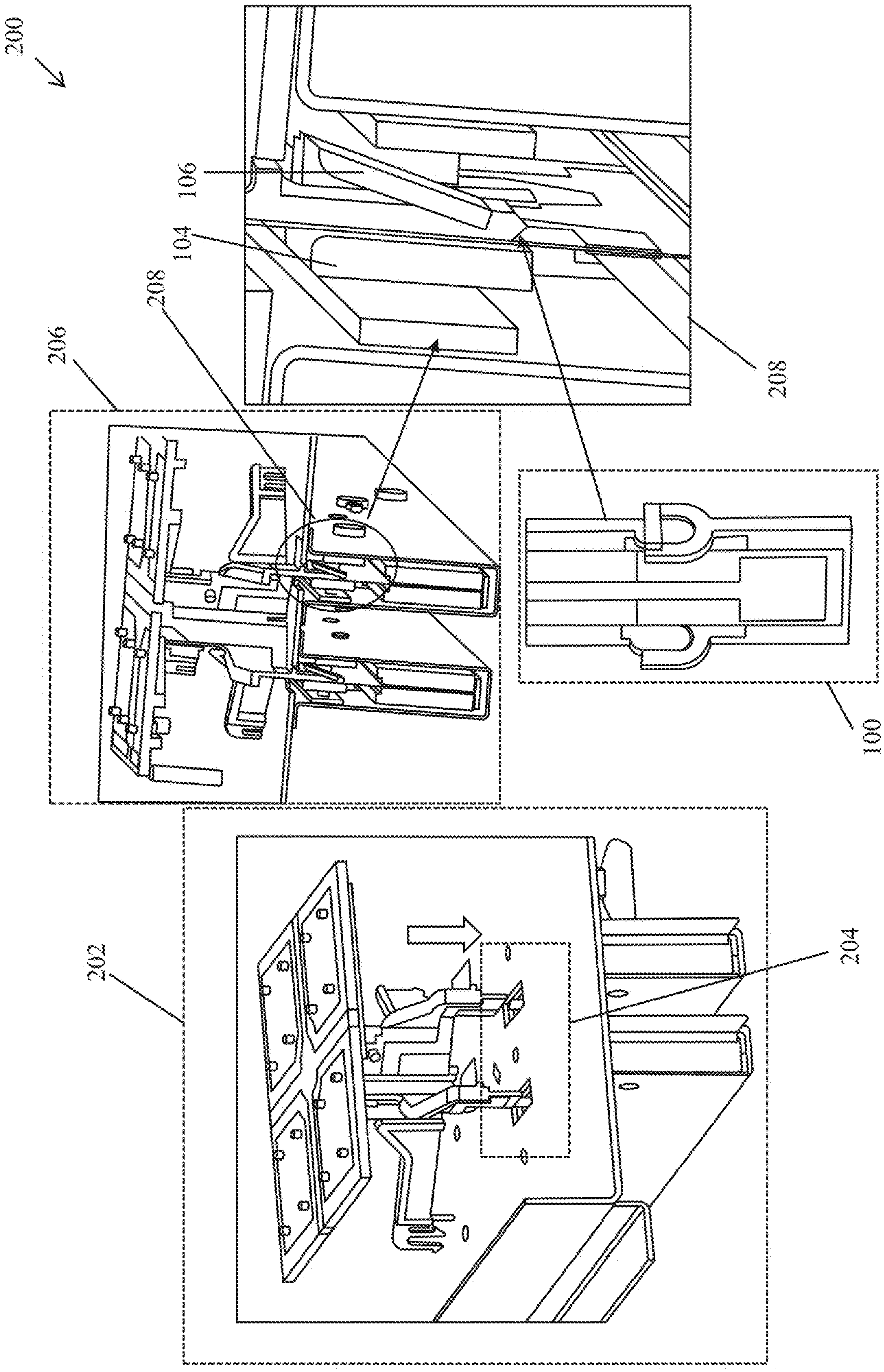
FIG. 2 is a schematic view that depicts plugging of a dipole within an antenna element, in accordance with an embodiment of the present disclosure.

FIG. 2 is a schematic view that depicts plugging of a dipole within an antenna element, in accordance with an embodiment of the present disclosure. FIG. 2 is described in conjunction with elements from FIG. 1. With reference to FIG. 2, there is shown a schematic view 200 that depicts plugging of the dipole 100 (of FIG. 1) within an antenna element 202.

In the schematic view 200, the dipole 100 is plugged within the antenna element 202. The antenna element 202 may be a phase shifter or a signal distribution network. The dipole 100 is plugged within the antenna element 202 through the flexible end 102 and a connection area is represented with a dashed box 204. A detailed structure of the antenna element 202 within the dashed box 204 is represented as a portion 206 of the antenna element 202. The dipole 100 is plugged into the portion 206 of the antenna element 202 and plugging is represented by an elliptical box 208. In the elliptical box 208, it is represented that the first plastic part 104 and the second plastic part 106 of the dipole 100 insert force to connect the dipole 100 with the antenna element 202. The dipole 100 is plugged within the antenna element 202 by use of the first plastic part 104 and the second plastic part 106 and a gap-free connection is realized. Moreover, the dipole 100 may be connected with more than one connection at once by use of the structural part 116 and the pluggable part 118 of the first plastic part 104 and the second plastic part 106 of the flexible end 102 of the dipole 100.

Figure 3:
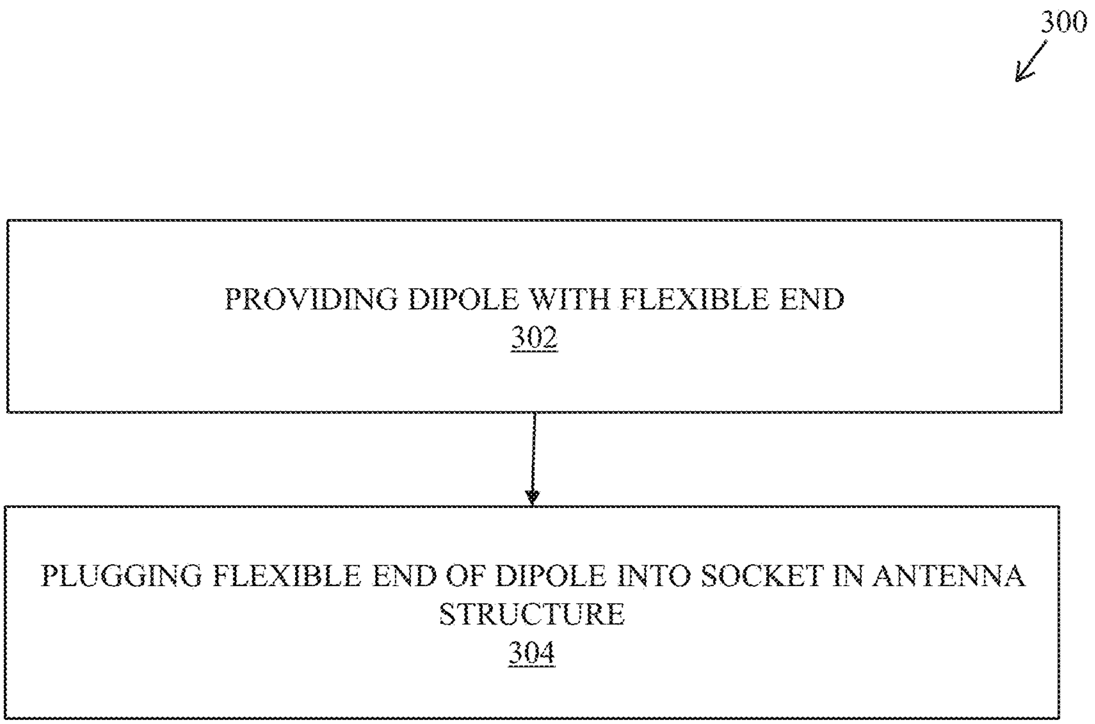
FIG. 3 is a flowchart of a method of connecting a dipole with an antenna structure, in accordance with an embodiment of the present disclosure.

FIG. 3 is a flowchart of a method of connecting a dipole with an antenna structure, in accordance with an embodiment of the present disclosure. FIG. 3 is described in conjunction with elements from FIGS. 1 and 2. With reference to FIG. 3, there is shown a method 300 for connecting the dipole 100 (of FIG. 1) with an antenna structure (e.g., the antenna element 202 of FIG. 2). The method 300 includes 302 and 304 steps. The method 300 is executed by the dipole 100 and the antenna element 202.

The present disclosure provides a method (i.e., the method 300) of connecting the dipole 100 with an antenna structure (i.e., the antenna element 202), comprising:

providing the dipole 100 with a flexible end (i.e., the flexible end 102), plugging the flexible end 102 of the dipole 100 into a socket in the antenna structure (i.e., the antenna element 202).

At step 302, the method 300 comprises providing the dipole 100 with the flexible end 102. The dipole 100 is provided with the flexible end 102 in order to have one or more flexible connections with the antenna structure (i.e., the antenna element 202).

At step 304, the method 300 further comprises plugging the flexible end 102 of the dipole 100 into a socket in the antenna structure. The dipole 100 is provided with the flexible end 102 in order to adjust one or more flexible connections with the antenna structure (i.e., the antenna element 202) at very low tolerances.

In accordance with an embodiment, the method 300 further comprises providing the flexible end 102 with two plastic parts hingedly connected to each other. The two plastic parts of the flexible end 102, such as the first plastic part 104 and the second plastic part 106 are hingedly connected to each other so that either one of the first plastic part 104 and the second plastic part 106 or both may be adjusted (or moved) depending on a requirement.

In accordance with an embodiment, the two plastic parts comprise a structural part (i.e., the structural part 116) and a pluggable part (i.e., the pluggable part 118). The structural part 116 and the pluggable part 118 of the first plastic part 104 and the second plastic part 106 enables the dipole 100 to have more than one connection at once.

In accordance with an embodiment, the method 300 further comprises providing the flexible end with a hinge (i.e., the hinge 108) being configured for rotating the pluggable part 118 at an angle about the structural part 116 on the application of a predetermined force. The hinge 108 is provided to rotate the pluggable part 118 at a certain angle about the structural part 116 and allowed to move in the direction transverse to the length of the structural part 116 on applying the predetermined force.

In accordance with an embodiment, the hinge 108 is configured for preserving a stable shape of the flexible end 102 on the application of a force less than the predetermined force. On application of the force less than the predetermined force, the hinge 108 is configured to preserve the stable shape of the flexible end 102 by allowing the pluggable part 118 to rotate and to move in the desired direction and with the desired angle about the structural part 116.

In accordance with an embodiment, the method 300 further comprises providing the flexible end 102 with a plastic foil (i.e., the plastic foil 110) and depositing a metal structure (i.e., the metal structure 112) on the plastic foil 110. By virtue of depositing the metal structure 112 on the plastic foil 110, a flexibility between the two plastic parts that is the first plastic part 104 and the second plastic part 106 may be realized.

In accordance with an embodiment, the method 300 further comprises providing capacitive coupling in the socket between the metal structure 112 and an antenna element (i.e., the antenna element 202). By virtue of the plastic foil 110, the flexible end 102 is configured to provide the capacitive coupling between the metal structure 112 and the antenna element 202.

In accordance with an embodiment, the antenna element 202 comprises a phase shifter or a signal distribution network. In an implementation, the flexible end 102 of the dipole 100 may be capacitively connected to the antenna element 202 which may be the phase shifter or the signal distribution network with very low tolerance.

In accordance with an embodiment, the method 300 further comprises providing the dipole 100 with two or more flexible ends, and plugging the flexible ends into sockets in the antenna structure (i.e., the antenna element 202) into a single movement. In an implementation, the dipole 100 may have two or more flexible ends which are further plugged into sockets in the antenna structure into the single movement without tolerances because tolerances can be aligned by flexibility.

Thus, the method 300 provides a pluggable and adjustable connection of the dipole 100 with the antenna structure (i.e., the antenna element 202). The method 300 provides the dipole 100 to be capacitively coupled with more than one connection at a time with perfect contact or position in all directions at either low tolerances or without tolerances. The capacitive coupling of the dipole 100 requires no additional process to connect, hence, the dipole 100 requires no additional cost. Moreover, the method 300 provides the dipole 100 to be used in an antenna that is further used in a base station for mobile communication.

The steps 302 and 304 are only illustrative and other alternatives can also be provided where one or more steps are added, one or more steps are removed, or one or more steps are provided in a different sequence without departing from the scope of the claims herein.

Figure 4:
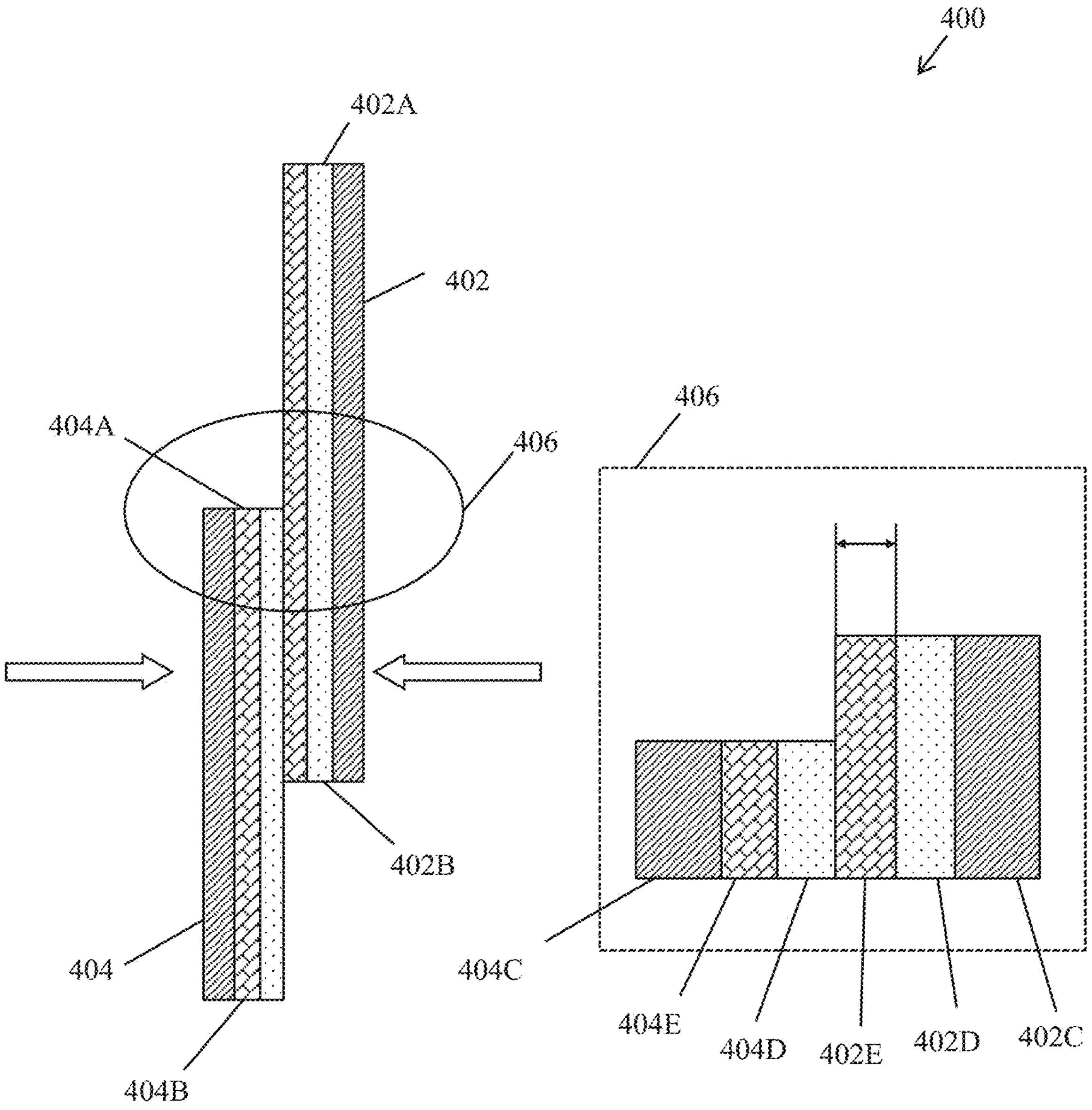
FIG. 4 is a schematic view of capacitive coupling of one or more dipoles, in accordance with an embodiment of the present disclosure.

FIG. 4 is a schematic view of capacitive coupling of one or more dipoles, in accordance with an embodiment of the present disclosure. FIG. 4 is described in conjunction with elements from FIGS. 1, 2, and 3. With reference to FIG. 4, there is shown a schematic view 400 that depicts capacitive coupling of two dipoles, such as a first dipole 402 and a second dipole 404. The first dipole 402 includes a first end 402A, a second end 402B, a plastic support 402C, a metal structure 402D and a flexible plastic foil 402E Similarly, the second dipole 404 includes a first end 404A, a second end 404B, a plastic support 404C, a metal structure 404D and a flexible plastic foil 404E.

Each of the first dipole 402 and the second dipole 404 corresponds to the dipole 100 (of FIG. 1). Each of the first end 402A, 404A and the second end 402B, 404B of the first dipole 402 and the second dipole 404, respectively, is adjustable and a gap-free connection may be realized and with very low tolerance. The first dipole 402 and the second dipole 404 can be capacitively coupled by applying a predetermined force (or pressure) to both of the first dipole 402 and the second dipole 404. The capacitive coupling of the first dipole 402 and the second dipole 404 is represented by a circular box 406.

In the circular box 406, the flexible plastic foil 402E is enclosed with the metal structure 402D of the first dipole 402 and the metal structure 404D of the second dipole 404, hence, the flexible plastic foil 402E perform as a dielectric between the metal structure 402D and the metal structure 404D. In this way, the flexible plastic foil 402E together with the metal structure 402D and the metal structure 404D results into a capacitor with a dielectric in between. By virtue of the capacitor with the dielectric in between, the first dipole 402 and the second dipole 404 are connected with no gap and very low tolerance between the metal structure 402D and the metal structure 404D.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

What is claimed is:

1. A dipole comprising a flexible end configured for being plugged into a socket in an antenna structure, wherein the flexible end comprises a plastic foil and a metal structure deposited on the plastic foil.

2. The dipole of claim 1, wherein the flexible end comprises two plastic parts hingedly connected to each other.

3. The dipole of claim 2, wherein the two plastic parts comprise a structural part and a pluggable part.

4. The dipole of claim 3, wherein the flexible end comprises a hinge configured for rotating the pluggable part at an angle about the structural part and allowing for a movement of the pluggable part in a direction transverse to a length of the structural part on an application of a predetermined force.

5. The dipole of claim 4, wherein the hinge is configured for preserving a stable shape of the flexible end on an application of a force less than the predetermined force.

6. The dipole of claim 1, wherein the flexible end is configured for providing capacitive coupling in the socket between the metal structure and an antenna element.

7. The dipole of claim 6, wherein the antenna element comprises a phase shifter or a signal distribution network.

8. The dipole of claim 6, wherein the dipole comprises two or more flexible ends configured for being plugged into sockets in the antenna structure into a single movement.

9. A method of connecting a dipole with an antenna structure, comprising:

providing a dipole with a flexible end;

providing the flexible end with a plastic foil and depositing a metal structure on the plastic foil; and plugging the flexible end of the dipole into a socket in an antenna structure.

10. The method of claim 9, further comprising:

providing the flexible end with two plastic parts hingedly connected to each other.

11. The method of claim 10, wherein the two plastic parts comprise a structural part and a pluggable part.

12. The method of claim 11, further comprising:

providing the flexible end with a hinge being configured for rotating the pluggable part at an angle about the structural part on an application of a predetermined force.

13. The method of claim 12, wherein the hinge is configured for preserving a stable shape of the flexible end on an application of a force less than the predetermined force.

14. The method of claim 9, further comprising:

providing capacitive coupling in the socket between the metal structure and an antenna element.

15. The method of claim 14, wherein the antenna element comprises a phase shifter or a signal distribution network.

16. The method of claim 14, further comprising:

providing the dipole with two or more flexible ends; and plugging the flexible ends into sockets in the antenna structure into a single movement.

17. A system comprising two dipoles that are capacitively coupled to each other, wherein at least one of the two dipoles comprises a flexible end configured for being plugged into a socket in an antenna structure, wherein the flexible end comprises a plastic foil and a metal structure deposited on the plastic foil.

18. The system of claim 17, wherein the flexible end comprises two plastic parts hingedly connected to each other.

19. The system of claim 18, wherein the two plastic parts comprise a structural part and a pluggable part.

20. The system of claim 19, wherein the flexible end comprises a hinge configured for rotating the pluggable part at an angle about the structural part and allowing for a movement of the pluggable part in a direction transverse to a length of the structural part on an application of a predetermined force.

* * * * *